(12) United States Patent
Yoshida et al.

(10) Patent No.: US 11,041,545 B2
(45) Date of Patent: Jun. 22, 2021

(54) BENDING MESHING TYPE GEAR DEVICE

(71) Applicant: SUMITOMO HEAVY INDUSTRIES, LTD., Tokyo (JP)

(72) Inventors: Shinji Yoshida, Kanagawa (JP); Toshiya Nagumo, Kanagawa (JP); Masayuki Ishizuka, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 188 days.

(21) Appl. No.: 16/375,465

(22) Filed: Apr. 4, 2019

(65) Prior Publication Data

US 2019/0316653 A1 Oct. 17, 2019

(30) Foreign Application Priority Data

Apr. 16, 2018 (JP) .............................. JP2018-078068

(51) Int. Cl.
*F16H 49/00* (2006.01)
*F16H 1/32* (2006.01)
*F16C 19/26* (2006.01)

(52) U.S. Cl.
CPC .............. *F16H 1/32* (2013.01); *F16C 19/26* (2013.01)

(58) Field of Classification Search
CPC .................................................. F16H 49/001

USPC .......................................................... 74/640
See application file for complete search history.

(56) References Cited

U.S. PATENT DOCUMENTS

| | | | | |
|---|---|---|---|---|
| 4,509,904 A | * | 4/1985 | MacAskill | .......... F04B 11/0041 417/568 |
| 9,109,662 B2 | * | 8/2015 | Kobayashi | ............ F16H 49/001 |
| 9,327,618 B2 | * | 5/2016 | Villarroel | ............. B60N 2/2252 |
| 10,612,638 B2 | * | 4/2020 | Otsuka | ..................... F16H 57/02 |
| 10,816,073 B2 | * | 10/2020 | Kobayashi | ............ F16H 49/001 |
| 2015/0107387 A1 | * | 4/2015 | Kuo | ...................... F16H 49/001 74/412 R |

FOREIGN PATENT DOCUMENTS

JP 2017-106626 A 6/2017

* cited by examiner

*Primary Examiner* — Ha Dinh Ho
(74) *Attorney, Agent, or Firm* — Michael Best & Friedrich LLP

(57) ABSTRACT

A bending meshing type gear device includes an internal gear, an external gear which meshes with the internal gear, a wave generator which bends and deforms the external gear, and a wave generator bearing which is disposed between the wave generator and the external gear, in which the wave generator bearing has a rolling body and an outer ring, and a minimum inner peripheral length of the external gear is larger than a maximum outer peripheral length of the outer ring.

6 Claims, 4 Drawing Sheets

BENDING MESHING TYPE GEAR DEVICE

RELATED APPLICATIONS

Priority is claimed to Japanese Patent Application No. 2018-078068, filed Apr. 16, 2018, the entire content of which is incorporated herein by reference.

BACKGROUND

Technical Field

Certain embodiment of the present invention relates to a bending meshing type gear device.

Description of Related Art

In the related art, there is a bending meshing type gear device having an external gear which is bent and deformed by a wave generator and an internal gear which meshes with the external gear. In general, in the bending meshing type gear device, a bearing (wave generator bearing) is disposed between the external gear and the wave generator, and an outer ring of the bearing is fitted to an inner periphery of the external gear by interference fit or the like. In the bending meshing type gear device, the outer ring of the bearing and the external gear are bent and deformed by a rotation of the wave generator, and thus, a portion of the external gear meshes with the internal gear, and a deceleration operation is generated.

SUMMARY

According to an embodiment of the present invention, there is provided a bending meshing type gear device including: an internal gear; an external gear which meshes with the internal gear; a wave generator which bends and deforms the external gear; and a wave generator bearing which is disposed between the wave generator and the external gear, in which the wave generator bearing has a rolling body and an outer ring, and a minimum inner peripheral length of the external gear is larger than a maximum outer peripheral length of the outer ring.

DETAILED DESCRIPTION

In a bending meshing type gear device, when an external gear is bent and deformed, slip between an outer ring and an external gear is generated by a mechanical operation, and thus, abnormal wear may occur on a fitting surface. There are problems that the abnormal wear increases a temperature of the portion and wear powder increases. In addition, as the abnormal wear processes, backlash in a meshing portion of the gear is generated.

It is desirable to prevent the abnormal wear from occurring between the external gear and the outer ring in the bending meshing type gear device.

According to the present invention, it is possible to prevent abnormal wear from occurring between the external gear and the outer ring in the bending meshing type gear device.

Hereinafter, an embodiment of the present invention will be described with reference to the drawings.

Figure 1:
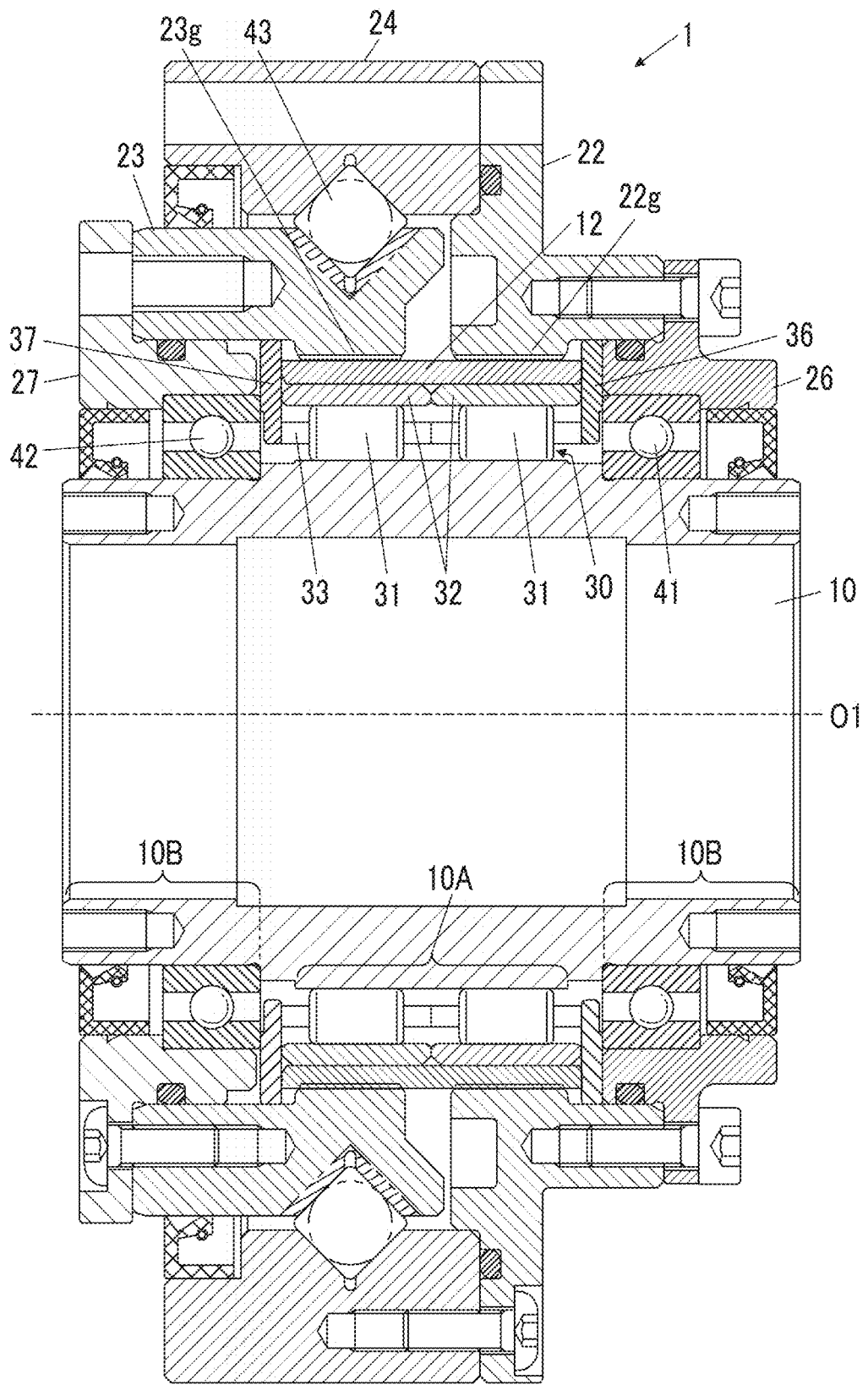
FIG. 1 is a sectional view showing a bending meshing type gear device according to an embodiment of the present invention.
Figure 2:
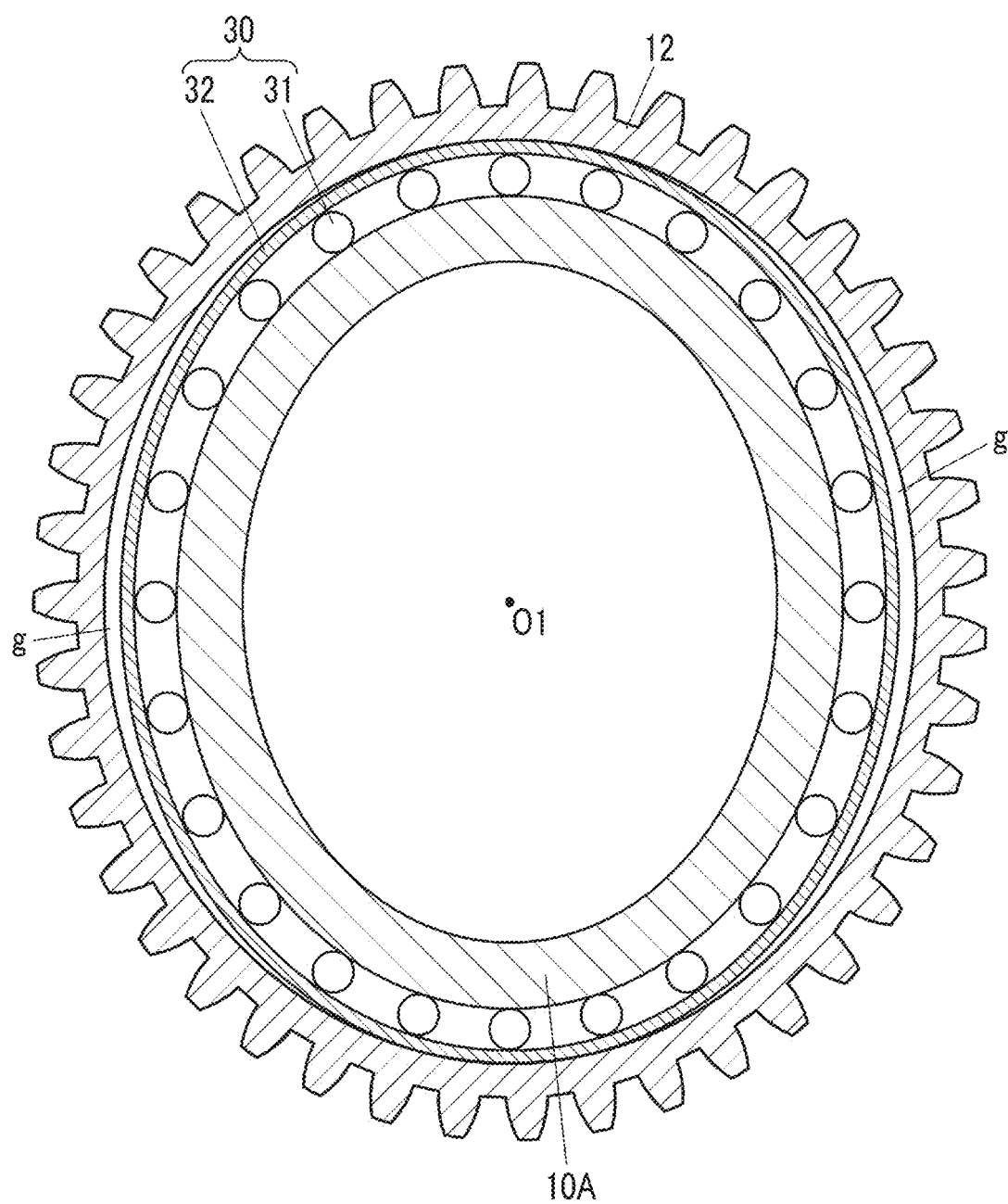
FIG. 2 is a conceptual view when an external gear, a wave generator, and a wave generator bearing in FIG. 1 are viewed in an axial direction.

FIG. 1 is a sectional view showing a bending meshing type gear device according to the embodiment of the present invention. FIG. 2 is a conceptual view when an external gear, a wave generator, and a wave generator bearing in FIG. 1 are viewed in an axial direction. In the present specification, a direction along a rotation axis O1 of a bending meshing type gear device 1 is defined as an axial direction, a direction orthogonal to the rotation axis O1 is defined as a radial direction, and a rotation direction about the rotation axis O1 is defined as a circumferential direction. The rotation axis O1 corresponds to a rotation axis according to the present invention.

As shown in FIG. 1, the bending meshing type gear device 1 according to the present embodiment includes a wave generator shaft 10, an external gear 12 which is bent and deformed by the wave generator shaft 10, two internal gears 22g and 23g which mesh with the external gear 12, and a wave generator bearing 30. In addition, the bending meshing type gear device 1 includes a first casing 22, an internal gear member 23, a second casing 24, a first cover 26, a second cover 27, bearings 41 and 42, and a main bearing 44.

The wave generator shaft 10 has a hollow shaft shape, and has a wave generator 10A whose cross section perpendicular to the rotation axis O1 has an elliptical outer shape and shaft portions 10B and 10B which are provided both sides of the wave generator 10A in the axial direction and whose cross section perpendicular to the rotation axis O1 has a circular outer shape. The elliptical shape needs not necessarily be a geometrically exact ellipse but includes an approximate ellipse. The wave generator shaft 10 rotates about the rotation axis O1, and a center of the outer shape of the cross section of the wave generator 10A perpendicular to the rotation axis O1 coincides with the rotation axis O1.

The external gear 12 is a cylindrical metal having flexibility and teeth are provided on an outer periphery of the external gear 12.

One of the two internal gears 22g and 23g meshes with a tooth portion on one end side from a center of the external gear 12 in the axial direction and the other thereof meshes with a tooth portion on the other end side from the center of the external gear 12 in the axial direction. The internal gear 22g is constituted by providing internal teeth at corresponding locations on an inner peripheral portion of the first casing 22. The internal gear 23g is constituted by providing internal teeth at corresponding locations on an inner peripheral portion of the internal gear member 23.

The wave generator bearing 30 is disposed between an outer peripheral surface of the wave generator 10A and an inner peripheral surface of the external gear 12. The wave generator bearing 30 has a plurality of rolling bodies (rollers) 31, an outer ring 32 which has a cylindrical shape and is a metal member having flexibility, and a holder 33 which holds axial positions and circumferential intervals of the plurality of rolling bodies 31. The plurality of rolling bodies 31 has a first group of rolling bodies 31 which are disposed to be circumferentially arranged radially inside the one internal gear 22g and a second group of rolling bodies 31 which are disposed to be circumferentially arranged radially inside the other internal gear 23g. The plurality of rolling bodies 31 roll with the outer peripheral surface of the wave generator 10A and an inner peripheral surface of the outer ring 32 as rolling surfaces. In the present embodiment, the outer ring 32 is divided into a portion facing one end side portion from a center portion of the external gear 12 in the axial direction and a portion facing the other end side portion from the center portion of the external gear 12. However, the outer ring 32 maybe integrally configured. Moreover, the wave generator bearing 30 may have a dedicated inner ring.

Spacer rings 36 and 37 are provided on both sides of the external gear 12, the outer ring 32, and the holder 33 in the axial direction, and the spacer rings 36 and 37 abut against the external gear 12, the outer ring 32, and the holder 33 and prevent the external gear 12, the outer ring 32, and the holder 33 from being displaced in the axial direction.

The first casing 22 and the second casing 24 are connected to each other and cover radially outer sides of the internal gears 22g and 23g and the external gear 12. The first cover 26 is connected to the first casing 22 and covers an outer peripheral portion of the wave generator shaft 10 on one end side of the wave generator shaft 10. The second cover 27 is connected to the internal gear member 23 and covers an outer peripheral portion of the wave generator shaft 10 on the other end side of the wave generator shaft 10. The first cover 26 rotatably supports the wave generator shaft 10 via a bearing 41 and the second cover 27 rotatably supports the wave generator shaft 10 via a bearing 42. The internal gear member 23 and the second casing 24 support each other to be rotatable to relative to each other via the main bearing 43.

<Dimensional Relationship between External Gear 12 and Outer Ring 32>

As shown in FIG. 2, a maximum peripheral length of an outer peripheral surface of the outer ring 32 is shorter than a minimum peripheral length of the inner peripheral surface of the external gear 12. The reason why the maximum peripheral length of the outer peripheral surface of the outer ring 32 is compared is because, for example, in a case where chamfering is formed on an outer peripheral edge portion of the outer ring 32, a peripheral length of the chamfered portion is not a comparison target and a peripheral length of a portion of the outer ring 32 coming into contact with the external gear 12 is the comparison target. Similarly, the reason why the minimum peripheral length of the inner peripheral surface of the external gear 12 is compared is because, for example, in a case where chamfering is formed on an inner peripheral edge portion of the external gear 12, a peripheral length of the chamfered portion is not a comparison target and a peripheral length of a portion of the external gear 12 coming into contact with the outer ring 32 is the comparison target.

According to a relationship between the outer peripheral length of the outer ring 32 and the inner peripheral length of the external gear 12, gaps g are generated between the external gear 12 and the outer ring 32 in the vicinity of a short axis position of the external gear 12. The gaps g are generated over the entire length of a contact portion between the outer ring 32 and the external gear 12 in the axial direction. Here, the short axis position indicates an angular position (right and left directional positions centered on the rotation axis O1 in FIG. 2) at which a distance from the rotation axis O1 to the peripheral surface of the wave generator 10A is shortest centered on the rotation axis O1. The long axis position indicates an angular position (up and down directional positions centered on the rotation axis O1 in FIG. 2) at which the distance from the rotation axis O1 to the peripheral surface of the wave generator 10A is the longest centered on the rotation axis O1. The angular positions of the short axis positions and the long axis positions of the external gear 12 and the outer ring 32 are the same as angular positions of a short axis position and a long axis position of the wave generator 10A.

Figure 3A:
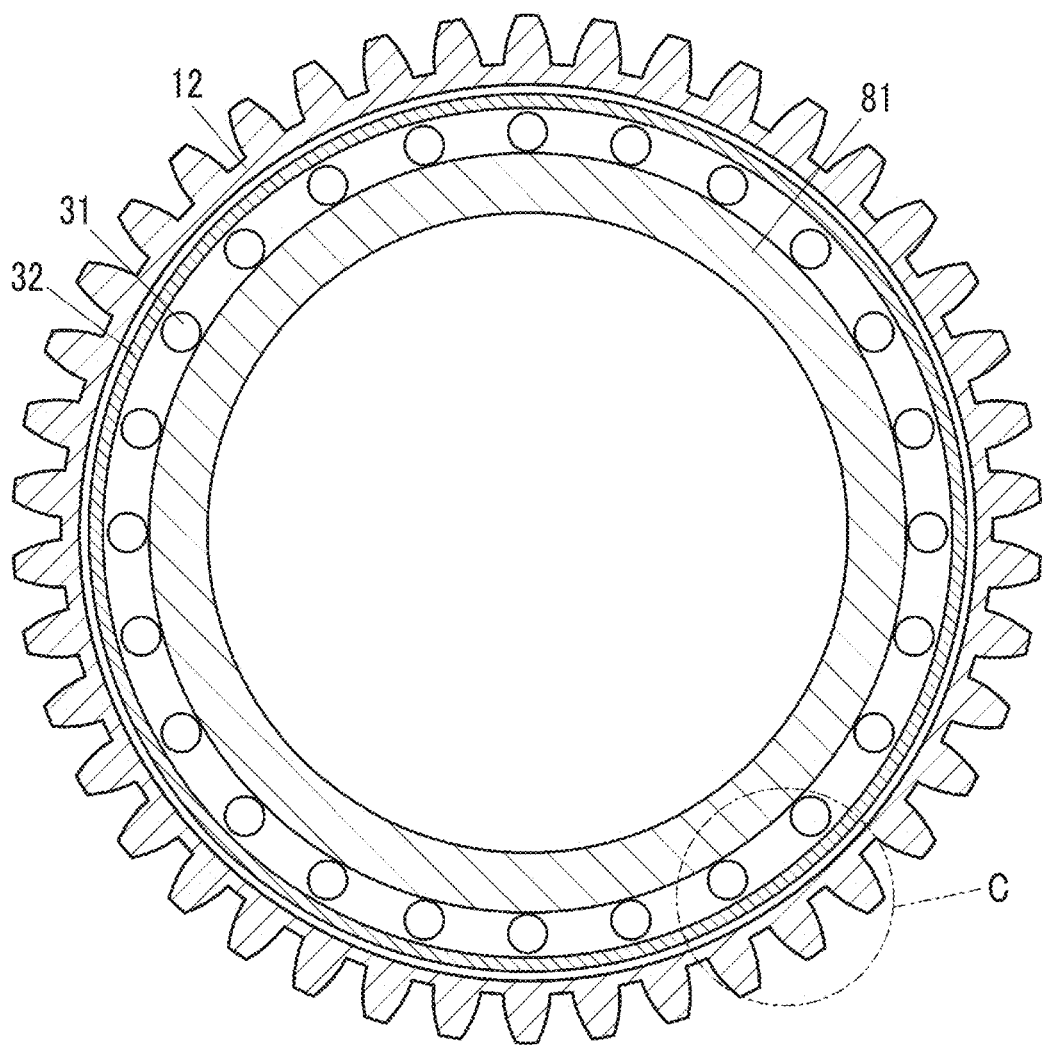
FIG. 3A is a view in which the external gear and the wave generator bearing are disposed in a perfect circle to indicate a gap dimension and FIG. 3B is an enlarged view of a portion of FIG. 3A.
Figure 3B:
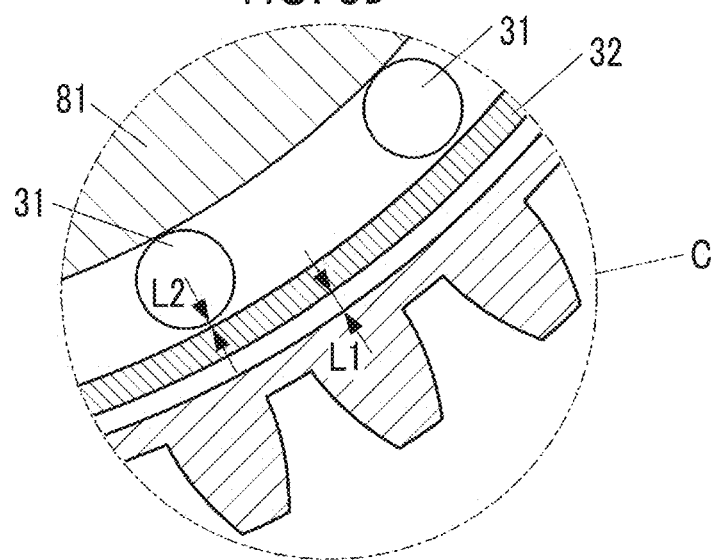

The wave generator bearing 30 has an internal gap. As shown in FIGS. 3A and 3B, in the internal gap, in a case where the external gear 12 and the wave generator bearing 30 are disposed in perfect circles and a cylinder 81 corresponding to an inner ring is assumed, in the rolling bodies 31, a gap is generated between an outer peripheral surface of the cylinder 81 and each rolling body 31, between each rolling body 31 and the inner peripheral surface of the outer ring 32, or both.

FIG. 3A is a view in which the external gear and the wave generator bearing are disposed in perfect circles to indicate a gap dimension and FIG. 3B is an enlarged view of a portion of FIG. 3A. The cylinder 81 shown in FIGS. 3A and 3B is a proportional member prepared for definition of dimensions, an outer peripheral length of the cylinder 81 is the same as an outer peripheral length of the wave generator 10A, and a cross section of the cylinder 81 is a member having a perfect circle.

As shown FIG. 3A, the external gear 12 and the wave generator bearing 30 are disposed concentrically and in perfect circles, a radial length L1 of a gap between the external gear 12 and the outer ring 32 and a radial length L2 of the internal gap of the wave generator bearing 30 have a relationship of L1>L2. The radial length L2 of the internal gap corresponds to a minimum radial length of the gap between the rolling body 31 and the outer ring 32 when the rolling body 31 comes into contact with the cylinder 81 having the outer peripheral length which is the same as that of the wave generator 10A.

Depending on an external load applied to the bending meshing type gear device 1, a load acting on the outer ring 32 may be deviated. Here, contrary to the configuration of the present embodiment, it is assumed that a relationship of L1 (the length of the gap between the external gear 12 and the outer ring 32)<L2 (the length of the internal gap of the wave generator bearing 30) is satisfied. In this case, the outer ring 32 is shifted toward one side in two short axis directions due to the deviation of the load, the gap g between the outer ring 32 and the external gear 12 is eliminated on the one side, and thus, there is a concern that wear occurs on the surface of this side. Meanwhile, in the present embodiment, L1 (the length of the gap between the external gear 12 and the outer ring 32)>L2 (the length of the internal gap of the wave generator bearing 30) is satisfied, and thus, even when the outer ring 32 is shifted toward one side in the two short axis directions due to the deviation of the load, the gap g between the outer ring 32 and the external gear 12 is not eliminated on the one side. Accordingly, it is possible to avoid the above-described inconvenience.

<Accumulation Configuration of Lubricant>

Figure 4A:
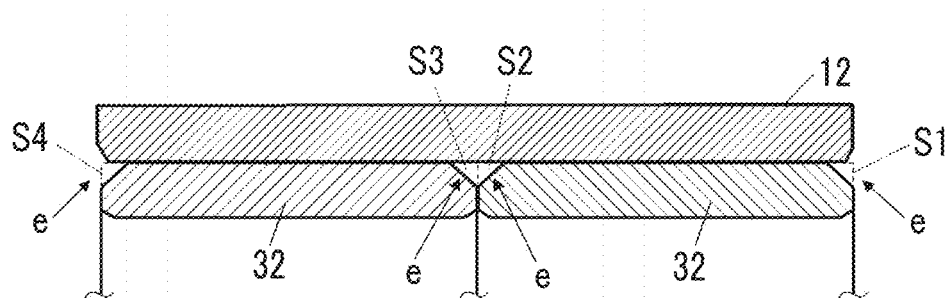
FIG. 4A is a sectional view of the external gear and the wave generator bearing at a long axis position and FIG. 4B is a sectional view of the external gear and the wave generator bearing in a short axis position.
Figure 4B:
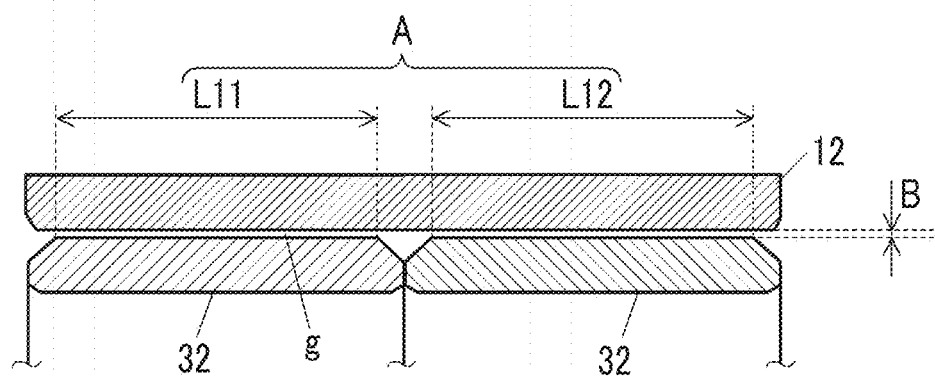

FIG. 4A is a sectional view of the external gear and the wave generator bearing at the long axis position and FIG. 4B is a sectional view of the external gear and the wave generator bearing in the short axis position.

As shown in FIGS. 4A and 4B, escape portions e, which are inclined in a direction approaching the inner peripheral side toward end portions in the axial direction, are provided on both end portions of the outer peripheral portion of each outer ring 32 in the axial direction. Each escape portion e is provided over the entire circumference of the outer ring 32 in the circumferential direction. In the example of FIGS. 4A and 4B, the outer ring 32 is divided at the center in the axial direction, and thus, each outer ring 32 has the escape portion e at a portion facing a center portion of the external gear 12 in the axial direction. Moreover, each escape portion e needs not to be inclined, but the escape portion e may be recessed from a surface where the outer ring 32 and the external gear 12 face each other. Alternatively, the escape portion e maybe provided in the external gear 12. In a case where each escape portion e is provided in the outer ring 32, the escape portion e may be recessed inward in the radial direction, and in a case where each escape portion e is provided in the external gear 12, the escape portion e may be recessed outward in the radial direction. In addition, the escape portion e is not provided at the center of the external gear 12 in the axial direction, and the escape portions e may be provided only on both sides thereof in the axial direction. Alternatively, the escape portion e is not provided on both sides and may be provided at only center.

In a flat cross section passing through the rotation axis O1, an axial length $A=L1+L2$ of a contact portion at the long axis position between the external gear 12 and the outer ring 32, a radial length B of the gap g in the short axis direction, and a total area (sectional area) $C=S1+S2+S3+S4$ of the escape portions e at the long axis position satisfy a relationship of $A \times B < C$. The areas S1 to S4 of the escape portions e mean an area of spaces secured by the escape portions e, as compared with a case where the escape portions e are edges without chamfering. The total area C of the escape portions e is a sum of areas of four escape portions e on both sides and at the center in the axial direction. Here, the radial length B of the gap g defines a radial length of the gap g when no load is applied to the bending meshing type gear device 1 and a rotation is not generated.

In a case where the gap g is generated between the external gear 12 and the outer ring 32, the wave generator shaft 10 rotates, and thus, the lubricant is extruded from the gap g in a range in which there is no gap g in the long axis direction (refer to FIG. 4A) while the lubricant enters the gap g generated in the short axis direction (refer to FIG. 4B). A portion of the lubricant moves in the circumferential direction as the gap g moves in the circumferential direction. However, most of the lubricant is extruded in the axial direction as the gap g moves in the circumferential direction or is sucked in the axial direction.

Accordingly, since the escape portion e having the above-described dimensional relationship is provided, the lubricant can be stored in the escape portions e in an angle range in which there is no gap g or the gap g decreases. In addition, in the angle range in which the gap g is generated, the lubricant stored in the escape portion e is moved to the gap g by a tension, and thus, it is possible to sufficiently supply the lubricant to the portion of the gap g. Moreover, according to the flow of the lubrication, wear powder generated between the external gear 12 and the outer ring 32 can be discharged to the escape portion e.

In addition, in a case where excess or deficiency of the lubricant is discussed, a volume of the portion where the lubricant is stored becomes an issue. However, if an attention is paid to one location in the circumferential direction, the lubricant moves between the escape portion e and the gap g at the location, and thus, it is possible to indicate the excess or deficiency of the lubricant depending on the area of the cross section.

<Deceleration Operation>

In the bending meshing type gear device 1 of the present embodiment, for example, the wave generator shaft 10 becomes an input shaft and is supported by the first casing 22 and the second casing 24, and the internal gear member 23 and the second cover 27 become output shafts. In addition, the number of teeth of the one internal gear 23g is set to be the same as the number of teeth of the external gear 12, and the number of teeth of the other internal gear 22g is set to be different from the number of teeth of the external gear 12.

According to this configuration, if the wave generator shaft 10 rotates, a motion of the wave generator shaft 10 is transmitted to the external gear 12 via the wave generator bearing 30. In this case, the external gear 12 meshes with the fixed internal gear 22g at the long axis position, and thus, the external gear 12 does not rotate at the same rotation rotate as that of the wave generator shaft 10, and the wave generator shaft 10 relatively rotates inside the external gear 12 via the wave generator bearing 30. In addition, the external gear 12 is restricted such that a portion of an inner peripheral surface of the external gear 12 is along the wave generator 10A in a range in the vicinity of the long axis position of the wave generator 10A, and thus, the external gear 12 is bend and deformed according to the rotation of the wave generator shaft 10. A period of this deformation is proportional to a rotation period of the wave generator shaft 10.

When the external gear 12 is bent and deformed by the rotation of the wave generator shaft 10, the long axis position of the wave generator 10A moves in a rotation direction, and thus, a meshing position between the external gear 12 and the first internal gear 22g is changed in the rotation direction. Here, since the number of teeth of the external gear 12 and the number of teeth of the internal gear 22g are different from each other, every time the meshing position goes round, meshing teeth between the external gear 12 and the first internal gear 22g are deviated from each other, and thus, the external gear 12 rotates. For example, if the number of teeth of the internal gear 22g is 102 and the number of teeth of the external gear 12 is 100, the rotary motion of the wave generator shaft 10 is decelerated at a speed reduction ratio 100:2, and the decelerated rotary motion is transmitted to the external gear 12.

Meanwhile, the external gear 12 also meshes with the internal gear 23g, and thus, a meshing position between the external gear 12 and the internal gear 23g is also changed in the rotation direction according to the rotation of the wave generator shaft 10. The number of teeth of the internal gear 23g and the number of teeth of the external gear 12 are the same as each other, and thus, the external gear 12 and the internal gear 23g do not rotate relative to each other, and the rotary motion of the external gear 12 is transmitted to the second internal gear 23g at a speed reduction ratio 1:1. Accordingly, the rotary motion of the wave generator shaft 10 is decelerated and the decelerated rotary motion is output to the internal gear member 23 and the second cover 27 which are the output shafts.

Moreover, the speed reduction can be changed by setting of the numbers of teeth of the external gear 12 and the internal gears 22g and 23g. In addition, components which are the input shaft, the output shaft, and the support portion maybe voluntarily changed among the wave generator shaft 10, the second casing 24, and the internal gear member 23.

When the external gear 12 is deformed and bent by the rotation of the wave generator shaft 10, the lubricant enters the gap g between the external gear 12 and the outer ring 32 in the short axis direction of the wave generator 10A. In addition, if an attention is paid to one location of the external gear 12 in the circumferential direction, the gap g is increased or decreased according to the movements of the external gear 12 and the outer ring 32 to the short axis position and the long axis position. In addition, a state where there is the gap g is changed to a state where there is no gap g and a pressure is generated between the inner peripheral surface of the external gear 12 and the outer peripheral surface of the outer ring 32. In this case, a wedge action of sucking the lubricant into between the external gear 12 and the outer ring 32 and compressing the lubricant is applied to the lubricant entering the gap g, an oil film is formed between the external gear 12 and the outer ring 32, and thus, it is possible to greatly decrease a friction force.

Moreover, when the external gear 12 and the outer ring 32 are bent and deformed by the rotation of the wave generator shaft 10, the lubricant enters the portion between the external gear 12 and the outer ring 32, and thus, the outer ring 32 can slide on the external gear at the long axis position. However, a thick lubricant is interposed between the external gear 12 and the outer ring 32 at the location at which the slide occurs, and thus, a direct contact between metals does not occur. Accordingly, abnormal wear is prevented from being generated on the inner peripheral surface of the external gear 12 and the outer peripheral surface of the outer ring 32.

Moreover, when the external gear 12 and the outer ring 32 are bent and deformed by the rotation of the wave generator shaft 10, the lubricant reciprocates between the escape portions e of the outer ring 32 and the gap g, and thus, the lubricant is prevented from flowing to other portions. Accordingly, even when the wave generator shaft 10 is rotated for a long period of time, the lubricant is sufficiently supplied to the gap g, and thus, the abnormal wear is prevented from being generated on the inner peripheral surface of the external gear 12 and the outer peripheral surface of the outer ring 32.

Hereinbefore, according to the bending meshing type gear device 1 of the embodiment of the present invention, the minimum inner peripheral length of the external gear 12 is larger than the maximum outer peripheral length of the outer ring 32. Accordingly, the gap g between the external gear 12 and the outer ring 32 to which the lubricant enters is generated in the short axis direction, and thus, the abnormal wear is prevented from occurring on the outer peripheral surface of the external gear 12 and the inner peripheral surface of the outer ring 32.

In addition, according to bending meshing type gear device 1 of the embodiment of the present invention, the gap g is provided over the entire length of the external gear 12 in the axial direction. Accordingly, it is possible to prevent the abnormal wear from occurring on the outer peripheral surface of the external gear 12 and the inner peripheral surface of the outer ring 32 in the entire region in the axial direction.

Moreover, according to bending meshing type gear device 1 of the embodiment of the present invention, the escape portions e are provided in the outer ring 32, and the total area C of the cross sections of the escape portions e is larger than the area (A×B) of the gap portion at the short axis position between the external gear 12 and the outer ring 32 (refer to FIGS. 4A and 4B). Accordingly, it is possible to prevent the lubricant from flowing to other portions due to the long-term rotation of the wave generator shaft 10, and prevent the lubricant to be supplied to the gap g from being insufficient.

In addition, according to bending meshing type gear device 1 of the embodiment of the present invention, as shown in FIGS. 3A and 3B, the radial length L2 of the internal gap of the wave generator bearing 30 is smaller than the radial length L1 of the gap between the external gear 12 and the outer ring 32. Accordingly, even when the deviated load is generated in the outer ring 32, the gap g between the external gear 12 and the outer ring 32 in the short axis direction is prevented from being eliminated, and thus, it is possible to prevent the abnormal wear from occurring on the outer peripheral surface of the external gear 12 and the inner peripheral surface of the outer ring 32.

Hereinbefore, the embodiment of the present invention is described. However, the present invention is not limited to the above-described embodiment. For example, in the embodiment, the wave generator bearing having two rows of rolling bodies is described as an example. However, one row of rolling bodies may be provided or three or more rows of rolling bodies may be provided. Moreover, in the embodiment, a flat type bending meshing gear device including the tubular external gear having flexibility is described as an example. However, for example, the bending meshing type gear device of the present invention can be applied to various bending meshing type gear devices such as a cup type bending meshing type bearing device or a silk hat type bending meshing type bearing device including a gear having flexibility.

It should be understood that the invention is not limited to the above-described embodiment, but may be modified into various forms on the basis of the spirit of the invention. Additionally, the modifications are included in the scope of the invention.

What is claimed is:

1. A bending meshing gear device comprising:
an internal gear;
an external gear which meshes with the internal gear;
a wave generator which bends and deforms the external gear; and
a wave generator bearing which is disposed between an outer peripheral surface of the wave generator and an inner peripheral surface of the external gear,
wherein the wave generator bearing comprises:
an outer ring, and
a plurality of rolling bodies which roll with an inner peripheral surface of the outer ring as a rolling surface,
wherein the outer ring is disposed radially inside the external gear,
wherein a pressure is generated between:
the inner peripheral surface of the external gear, and
an outer peripheral surface of the outer ring at a long axis position, the long axis position is at which a distance from a rotation center to a peripheral surface of the wave generator is longest, and
wherein a minimum inner peripheral length of the external gear is larger than a maximum outer peripheral length of the outer ring.

2. The bending meshing gear device according to claim 1, wherein a gap is provided over an entire length of the external gear in an axial direction between the external gear and the outer ring at a short axis position at which the distance from a rotation center to a peripheral surface of the wave generator is shortest.

3. A bending meshing gear device comprising:
an internal gear;
an external gear which meshes with the internal gear;
a wave generator which bends and deforms the external gear; and a wave generator bearing which is disposed between the wave generator and the external gear, wherein the wave generator bearing comprises a rolling body and an outer ring, and wherein a minimum inner peripheral length of the external gear is larger than a maximum outer peripheral length of the outer ring, wherein an escape portion which is recessed from a surface where the outer ring and the external gear face each other is provided in the outer ring, the external gear, or both thereof, and wherein an axial length A of a contact portion between the external gear and the outer ring at a long axis position at which a distance from a rotation center to a peripheral surface of the wave generator is longest, a radial length B of a gap g between the external gear and the outer ring at a short axis position at which the distance from the rotation center to the peripheral surface of the wave generator is shortest, and an area C of the escape portion in a cross section passing through the rotation center satisfy a relationship of $A \times B < C$.

4. A bending meshing gear device comprising:
an internal gear;
an external gear which meshes with the internal gear;
a wave generator which bends and deforms the external gear; and
a wave generator bearing which is disposed between the wave generator and the external gear, wherein the wave generator bearing comprises a rolling body and an outer ring, wherein a minimum inner peripheral length of the external gear is larger than a maximum outer peripheral length of the outer ring, and wherein when the outer ring and the external gear are concentrically disposed such that an outer periphery of the outer ring and an inner periphery of the external gear become a perfect circle in a cross section perpendicular to a rotation center and the rolling body is disposed to come into contact with an outer peripheral surface of a cylinder which is concentrically disposed with the outer ring and has a peripheral length of the wave generator, a radial length of a gap between the outer ring and the external gear is larger than a minimum radial length of a gap between the rolling body and the outer ring.

5. The bending meshing gear device according to claim 1, wherein the wave generator has an elliptical outer shape in a cross section perpendicular to a rotation axis, and wherein the wave generator bearing is disposed between the outer peripheral surface of the wave generator and the inner peripheral surface of the external gear.

6. The bending meshing gear device according to claim 1, wherein the rolling body of the wave generator bearing rolls with the outer peripheral surface of the wave generator as a rolling surface.

* * * * *